US011255583B2

(12) United States Patent
Mackin (10) Patent No.: US 11,255,583 B2
(45) Date of Patent: Feb. 22, 2022

(54) DRY ICE-BASED COOLING SYSTEMS (71) Applicant: The Boeing Company, Chicago, IL (US)

(72) Inventor: Steve Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 16/268,273

(22) Filed: Feb. 5, 2019

(65) Prior Publication Data

US 2020/0248933 A1 Aug. 6, 2020

(51) Int. Cl.
*F25B 19/00* (2006.01)
*B64D 13/08* (2006.01)
*B64D 13/06* (2006.01)

(52) U.S. Cl.
CPC .............. *F25B 19/00* (2013.01); *B64D 13/06* (2013.01); *B64D 13/08* (2013.01); *B64D 2013/0625* (2013.01)

(58) Field of Classification Search
CPC ......... F25B 19/00; B64D 13/06; B64D 13/08; B64D 2013/0625; B64D 2013/0674; F25D 3/12; B23C 3/00
See application file for complete search history.

(56) References Cited

U.S. PATENT DOCUMENTS

| 3,754,407 | A | 8/1973 | Tyree, Jr. | |
| 4,045,972 | A | 9/1977 | Tyree, Jr. | |
| 2012/0055182 | A1 | 3/2012 | Dubé | |
| 2016/0108320 | A1* | 4/2016 | Halais | B03B 1/00 208/391 |
| 2016/0325979 | A1* | 11/2016 | Cook | B67D 1/0857 |
| 2019/0234674 | A1* | 8/2019 | Nagamine | F25D 17/08 |

FOREIGN PATENT DOCUMENTS

| DE | 102005012926 B4 * | 2/2007 | ............... F25D 3/12 |
| DE | 102016105334 A1 * | 6/2017 | ............. F25B 9/008 |

* cited by examiner

*Primary Examiner* — Frantz F Jules
*Assistant Examiner* — Martha Tadesse
(74) *Attorney, Agent, or Firm* — Kolisch Hartwell, P.C.

(57) ABSTRACT

Apparatus, systems, and methods for providing cooled air to an aircraft using dry ice. The cooling apparatus includes dry ice hopper to store dry ice and feed it to a dry ice mill, which is turn mills the dry ice into an insulated vessel containing a fluid coolant. A fluid coolant loop connects the insulated vessel with a heat exchanger, and a pump transports the fluid coolant through the fluid coolant loop. An agitator within the insulated vessel is coupled to the pump, so that operation of the pump causes the agitator to agitate the mixture of fluid coolant and milled dry ice within the insulated vessel. Cool air is provided to the aircraft by an air delivery system that conveys air across the heat exchanger.

27 Claims, 4 Drawing Sheets

DRY ICE-BASED COOLING SYSTEMS

FIELD

This disclosure relates to cooling systems for use by aircraft, and more specifically, to cooling systems for aircraft that employ dry ice.

INTRODUCTION

When flying at high altitudes, modern aircraft employ air conditioning and air pressurization to maintain a comfortable environment for passengers. In general, outside air is permitted to enter an engine where it is compressed, and the hot compressed air is transported to onboard air conditioning units for cooling. The desired air temperature is achieved by mixing the cold conditioned air from the air conditioning unit with warm air, and the resulting regulated air is fed to a mixing unit that transports the air into the cabin and cockpit.

When the aircraft is stationary on the ground, however, the aircraft engines cannot be used in this way to power air conditioning systems. Some larger aircraft can instead employ auxiliary power units (APUs), or small powered generators that can provide power when needed for air conditioning and functions other than propulsion. Unfortunately, smaller aircraft and electrically-powered aircraft may not be able to employ an APU for air conditioning, due to weight and/or power limitations.

SUMMARY

The present disclosure provides apparatus, systems, and methods for providing cooled air to an aircraft using dry ice as a cooling agent.

In some embodiments, the disclosure provides an apparatus for providing cooled air within an aircraft, where the apparatus includes an insulated vessel containing a fluid coolant, a dry ice mill configured to mill dry ice into the fluid coolant, a dry ice hopper configured to store dry ice and feed the dry ice to the dry ice mill, a fluid coolant loop connecting the insulated vessel to a heat exchanger so that the fluid coolant may be delivered to the heat exchanger and returned to the insulated vessel, a pump operatively coupled with the fluid coolant loop to transport the fluid coolant through the fluid coolant loop, an agitator within the insulated vessel and coupled to the pump so that operation of the pump causes the agitator to agitate the mixture of fluid coolant and milled dry ice in the insulated vessel, and an air delivery system that conveys air across the heat exchanger and provides cooled air within the aircraft.

In some embodiments, the disclosure provides a system for providing cooled air within an aircraft, where the system includes an apparatus having an insulated vessel containing a heat transfer fluid, a dry ice mill to mill dry ice into the heat transfer fluid within the insulated vessel, a dry ice hopper to store dry ice and feed it to the dry ice mill, a fluid coolant loop connecting the insulated vessel and a heat exchanger to deliver the heat transfer fluid to the heat exchanger and return it to the insulated vessel, a pump coupled with the fluid coolant loop to transport the heat transfer fluid through the fluid coolant loop, and an agitator within the insulated vessel that is coupled to the pump so that operation of the pump causes the agitator to agitate the mixture of heat transfer fluid and milled dry ice within the insulated vessel. In addition, the system includes an air delivery system that conveys air across the heat exchanger and provides the cooled air within the aircraft, and a thermostat to operate the apparatus and provide air within the aircraft at a desired temperature.

In some embodiments, the disclosure provides a method of providing cooled air to an aircraft, the method including charging a dry ice hopper with dry ice, where the dry ice hopper is configured to feed the dry ice to a dry ice mill; milling the dry ice with the dry ice mill so that the milled dry ice is added to an insulated vessel containing a fluid coolant; agitating the mixture of fluid coolant and milled dry ice within the insulated vessel using an agitator disposed in the insulated vessel, cooling the fluid coolant; circulating the cooled fluid coolant through a fluid coolant loop using a pump, where the agitator is operatively coupled to the pump so that operation of the pump causes the agitator to agitate the mixture of fluid coolant and milled dry ice, where the fluid coolant loop delivers the fluid coolant to a heat exchanger and returns it to the insulated vessel; conveying air across the heat exchanger to cool the air; and providing the cooled air to the aircraft.

The disclosed features, functions, and advantages of the disclosed cooling apparatus, systems and methods may be achieved independently in various embodiments of the present disclosure, or may be combined in yet other embodiments, further details of which can be seen with reference to the following description and drawings.

DESCRIPTION

Various aspects and examples of apparatus, systems and methods of providing cooled air to aircraft are described below and illustrated in the associated drawings. Unless otherwise specified, the disclosed apparatus and/or their various components may, but are not required to, contain one or more of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments will necessarily provide the same advantages or the same degree of advantages.

Figure 1:
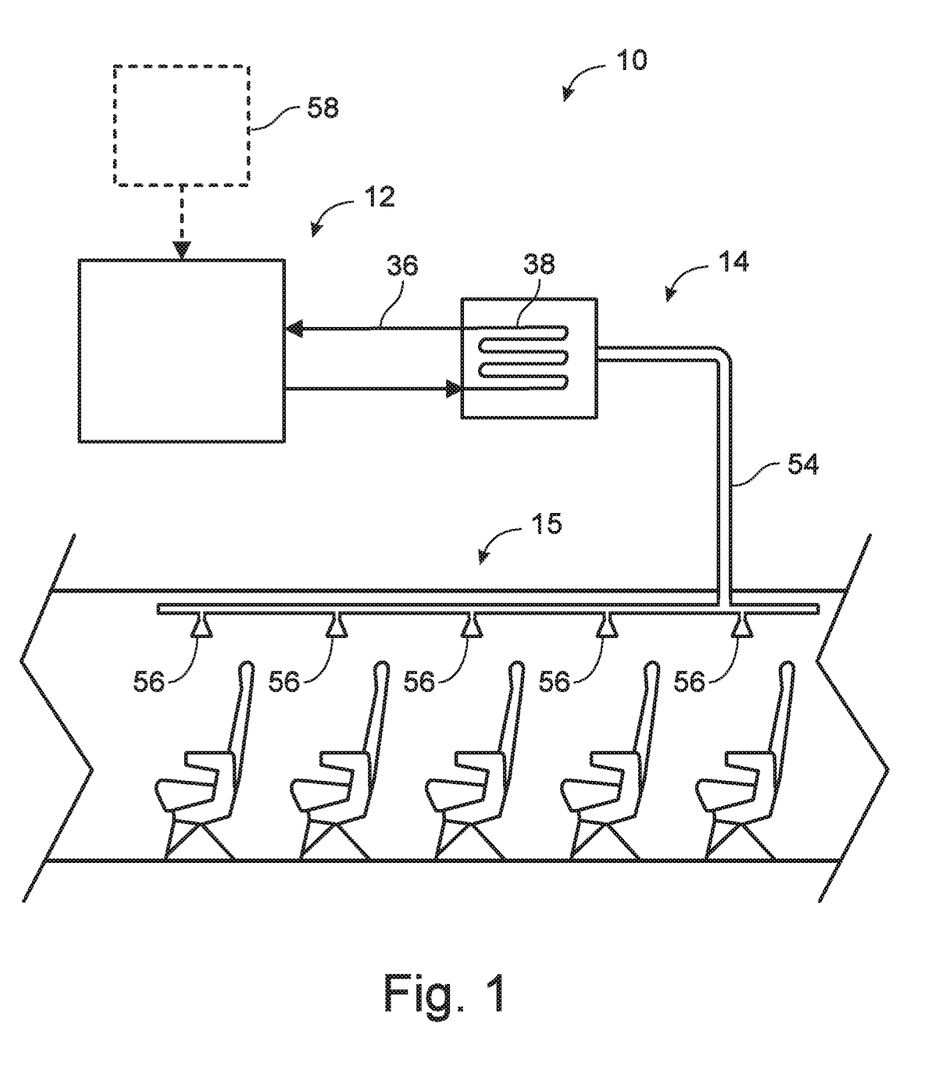
FIG. 1 schematically depicts an illustrative system for providing cooled air within an aircraft, according to the present disclosure.

A system 10 for providing cooled air within an aircraft is depicted in FIG. 1. System 10 may include an apparatus 12 for providing cooled air, and an air delivery system 14 for providing cooled air to an aircraft 15.

Figure 2:
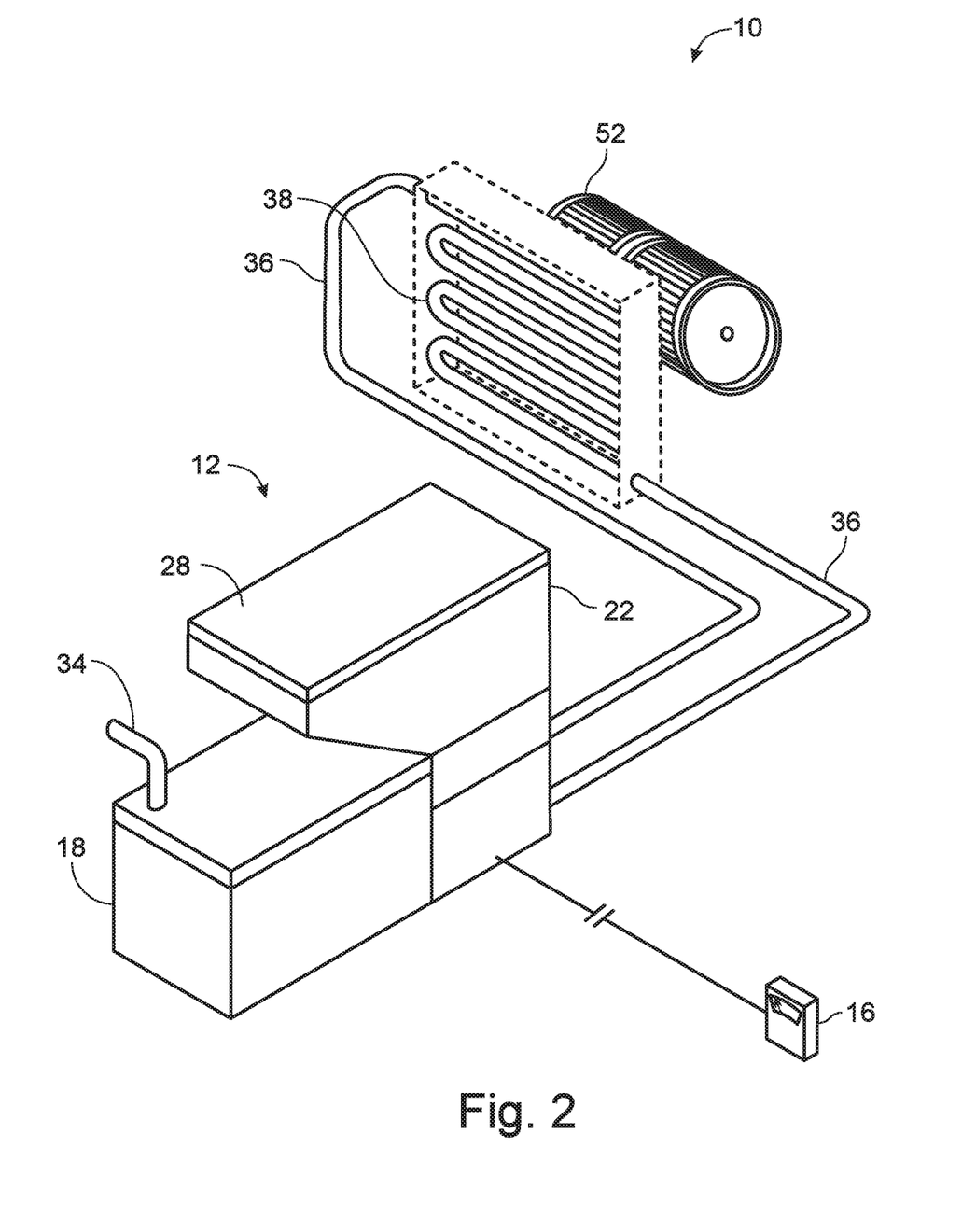
FIG. 2 semi-schematically depicts a system and apparatus for providing cooled air within an aircraft, according to the present disclosure.

System 10 and apparatus 12 are shown in greater detail in FIG. 2. Advantageously, apparatus 12 is configured to provide cooled air without the typically high demand for electricity created by conventional air cooling units employing vapor-compression refrigeration systems for cooling. Instead, apparatus 12 is configured to generate cooled air using dry ice (solid carbon dioxide). System 10 may include an apparatus 12 for providing cooled air using dry ice, an air delivery system 14 for providing cooled air to an aircraft 15, and a thermostat 16 that is configured to operate apparatus 12 and air delivery system 14 so as to provide air within aircraft 15 at the desired temperature. Apparatus 12 itself is shown in a partial cut-away view in FIG. 3.

Figure 3:
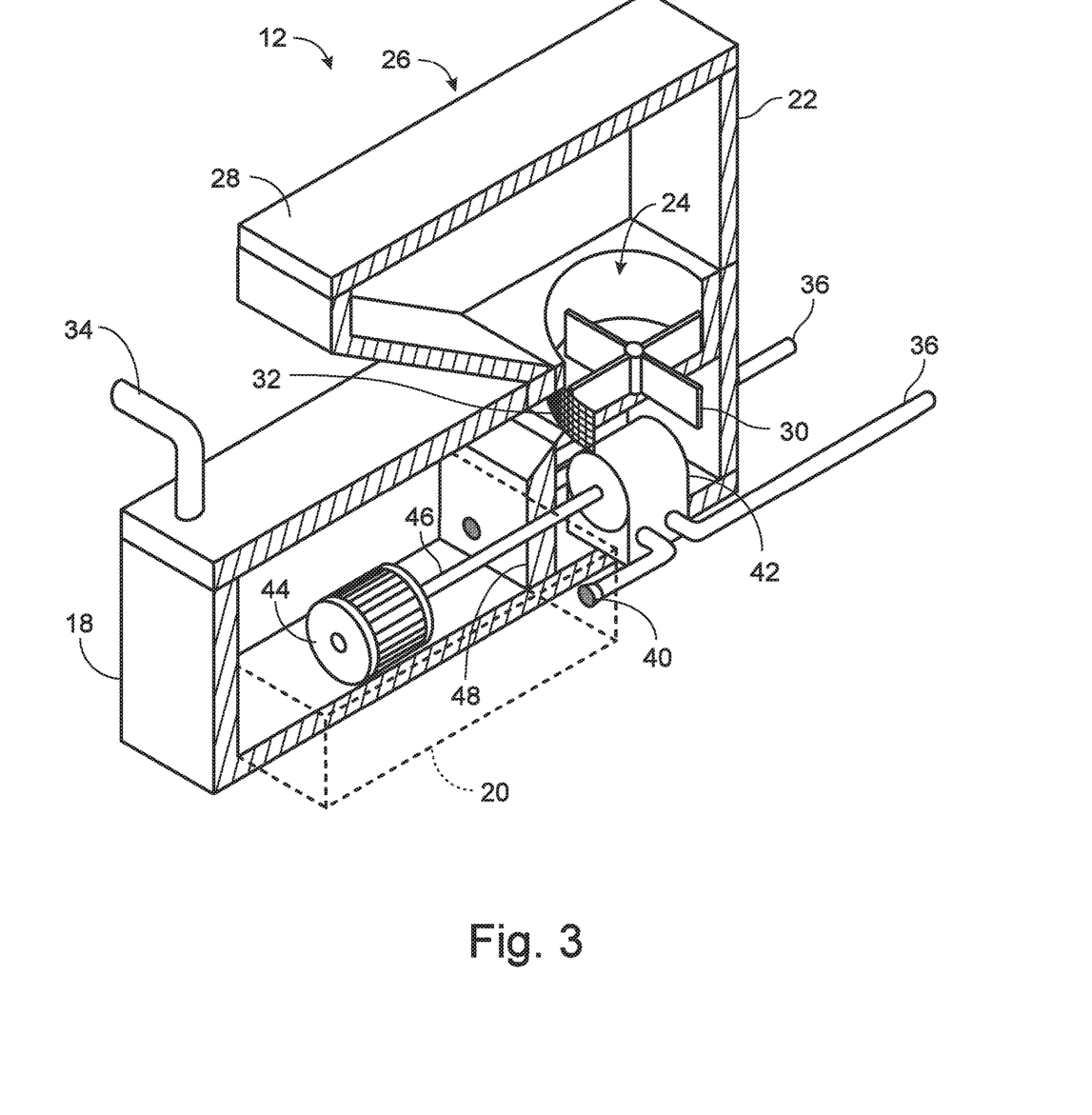
FIG. 3 is a cutaway view of an illustrative apparatus for providing cooled air within an aircraft, according to the present disclosure.

As shown in FIGS. 2 and 3, apparatus 12 may include an insulated vessel 18 containing a fluid coolant (or heat transfer fluid) 20. Insulated vessel 18 may employ any suitable insulation, but typically incorporates lightweight insulating materials, such as rigid foam insulation in order to minimize the overall weight of apparatus 12. Such foam insulation may be incorporated into apparatus 12 as preformed panels, or formed in place using a curable foam.

Fluid coolant 20 is preferably a heat transfer liquid having a low viscosity and a high thermal capacity. As it may be used within the cabin of an aircraft, fluid coolant 20 may be selected to be substantially or relatively non-toxic in the event of a leak or spill. It may also be advantageous that fluid coolant 20 be chemically inert, so as to avoid any corrosion of the components of apparatus 12. For economic reasons, it may be preferable to employ a fluid coolant that is low in cost.

Fluid coolant 20 may include an organic polyalcohol, or a mixture of more than one organic polyalcohol. In a particular aspect of the present disclosure, fluid coolant 20 may include one or more organic glycols. In another aspect of the present disclosure, fluid coolant 20 may include one or more of ethylene glycol, diethylene glycol, and propylene glycol. Where a less or non-toxic organic polyalcohol is desirable, fluid coolant 20 may include one or more of propylene glycol and glycerol. In one aspect of the disclosure, fluid coolant 20 may be substantially free of water. In an alternative aspect of the disclosure, fluid coolant 20 may have a composition of about 60% propylene glycol and about 40% water.

Apparatus 12 further include a dry ice hopper 22, which is configured to store dry ice, and additionally to feed the stored dry ice to a dry ice mill 24. Similar to insulated vessel 18, dry ice hopper 22 may include suitable insulation materials to minimize dry ice losses due to sublimation. Dry ice hopper 22 may include an upper opening 26 with sealable lid 28 to facilitate loading hopper 22 with solid carbon dioxide. Lid 28 may be configured to seal opening 26 sufficiently to substantially prevent sublimated carbon dioxide gas from escaping apparatus 12 via opening 26. Additionally, dry ice hopper 22 may be constructed with an appropriate geometry so that dry ice within hopper 22 is fed by gravity into dry ice mill 24, such as by incorporating a sloping surface, or having an overall funnel-like shape.

Dry ice mill 24 may include any type of milling machinery capable of fragmenting solid carbon dioxide into smaller pieces or a powder, and adding the milled dry ice to the fluid coolant 20 within insulated vessel 18. Any milling mechanism utilized by a commercially-available dry ice crusher and/or breaker may be a suitable milling mechanism for the purposes of apparatus 12. In one aspect of the present disclosure, dry ice mill may include milling machinery that includes a grinder, a crusher, a shredder, or a pelletizer. In an alternative aspect of the present disclosure, dry ice mill 24 may include milling machinery such as hammer mills, disc mills, rolling mills, knife mills, among other milling mechanisms.

In a particular aspect of the present disclosure as shown in FIG. 3, dry ice mill 24 is or includes a dry ice shredding mechanism having an impeller 30 and a screen 32, where activation of a milling motor (not shown) rotates impeller 30 which drives the pellets or fragments of dry ice in dry ice hopper 22 against screen 32, which converts the impelled dry ice into a powder, or dry ice "snow", that is then deposited into fluid coolant 20 within insulated vessel 18 to form a mixture of dry ice and fluid coolant.

Dry ice mill 24 may operate intermittently, for example when activated by thermostat 16. In this case dry ice stored in dry ice hopper 22 would not be deposited into insulated vessel 18 unless dry ice mill 24 was in operation. For example, dry ice would not be driven against screen 32 unless impeller 30 was energized.

The addition of milled dry ice to fluid coolant 20 simultaneously reduces the temperature of the coolant, and evolves gaseous carbon dioxide. The operation of the dry ice mill 24 may be controlled by the thermostat 16, for example, to regulate the addition of milled dry ice to fluid coolant 20, to control the rate of the dry ice amount introduced relative to the amount of coolant, such that the dry ice that sublimates when introduced in the coolant reduces the temperature of the coolant without permitting freezing of the coolant.

In one embodiment, the addition of dry ice is controlled by dry ice mill 24 and/or thermostat 16 to control the ratio of dry ice content relative to coolant content, so as to provide an amount of 34.5 lbs. (15.7 kilograms) of dry ice over a 30 minute period relative to a quantity of 9.5 lbs. or 2 gallons (4.3 kilograms or 7.57 liters) of ethylene glycol coolant, for example, which would reduce the temperature of coolant near to the point of freezing without freezing the coolant, and may deliver as much as 5 kilowatts of cooling within an aircraft. In this exemplary embodiment, the rate of dry ice addition may be 1 lb. (0.45 kilograms) of dry ice per minute relative to 9.5 lbs. (4.3 kilograms) of ethylene glycol coolant, such that the amount of dry ice by weight that is added per minute is a ratio of at least $\frac{1}{10}$ of the amount of coolant by weight that is within insulated vessel 18.

Alternatively, the coolant may provide an adequate amount of cooling within an aircraft where the rate of dry ice addition may be 0.5 lbs. (0.23 kilograms) of dry ice per minute relative to 9.5 lbs. (4.3 kilograms) of ethylene glycol coolant, such that the amount of dry ice by weight that is added per minute is a ratio of at least $\frac{1}{20}$ of the amount of coolant by weight that is within insulated vessel 18.

The addition of dry ice to fluid coolant 10 results in a reduction of temperature of the coolant, and the simultaneous generation of carbon dioxide gas. In order to prevent pressure building within insulated vessel 18, apparatus 12 may be equipped with a carbon dioxide vent 34. Although carbon dioxide vent 34 may simply serve to relieve pressure from building within insulated vessel 18, an increase in carbon dioxide within a closed aircraft may be undesirable, and so carbon dioxide vent 34 may be plumbed to be exhausted outside the aircraft. Alternatively, or in addition, carbon dioxide vent 34 may be plumbed so that evolved carbon dioxide may be delivered from apparatus 12 to one or more fuel tanks, cargo areas, galley areas, or electronic equipment to serve as either an inerting agent or a fire-suppressing agent.

As shown in FIG. 2, apparatus 12 may include a fluid coolant loop 36 connecting insulated vessel 18 and a heat exchanger 38. Fluid coolant loop 36 may be configured to deliver fluid coolant 20 to heat exchanger 38 and then return fluid coolant 20 to insulated vessel 18. Fluid coolant loop 36 may draw fluid coolant 20 directly from the volume of coolant within insulated vessel 18, and then return it to the volume of coolant within insulated vessel 18. Alternatively, an additional heat exchange coil may be used to keep the fluid coolant circulating within fluid coolant loop 36 from mixing with fluid coolant 20 within insulated vessel 18. Where fluid coolant 20 is itself circulated through fluid coolant loop 36, the fluid coolant intake 40 may be fitted with a screen or other apparatus that serves to prevent solid particles of carbon dioxide from being circulated within fluid coolant loop 36.

Fluid coolant 20 may be circulated within fluid coolant loop 36 by a pump 42 that is operatively coupled with fluid coolant loop 36, so that operation of pump 42 transports fluid coolant 20 through fluid coolant loop 36 and returns it to apparatus 12. Any appropriate pump mechanism may be used to circulate fluid coolant 20, provided that it is compatible with both the fluid coolant itself and is capable of operating without difficulty at the very low temperatures created by the circulating fluid coolant 20.

In a particular aspect of the disclosure, apparatus 12 includes an agitator 44 that is disposed within insulated vessel 18. In one aspect of the disclosure, agitator 44 may be coupled to pump 42, so that operation of the pump causes agitator 44 to simultaneously agitate the mixture of fluid coolant 20 and milled dry ice within insulated vessel 18.

In one aspect of the disclosure, as shown in FIG. 3, pump 42 includes and may be operatively coupled to a drive shaft 46 that may extend through a wall 48 of insulated vessel 18, where agitator 44 is in turn coupled to drive shaft 46, so that operation of pump 42 causes rotation of agitator 44 and agitates the mixture of milled dry ice and fluid coolant 20 within insulated vessel 18.

System 10 may further include an air delivery system 14 that conveys air across heat exchanger 38, and then provides the resulting cooled air within aircraft 15, as shown schematically in FIGS. 1 and 2. Air delivery system 14 may include a blower or impeller 52 configured to draw or push air through heat exchanger 38. Air delivery system 14 may further include one or more ducts 54 forming a duct network for providing cooled air to desired locations within the aircraft. In one aspect of the present disclosure, air delivery system 14 is configured to provide cooled air within aircraft 15 via a plurality of gaspers 56, or adjustable air outlets that are typically situated above each passenger seat. Gaspers 56 typically include round vents having a flow control dial and, in some cases, a directional nozzle.

Apparatus 12 may be configured to operate intermittently. In this aspect of the disclosure neither dry ice mill 24 nor pump 42 would typically operate constantly. Instead, apparatus 12 may be configured to operate in response to manual activation, such as when an aircraft is stationary and may be at risk for overheating, or apparatus 12 may be configured to respond to a control signal from thermostat 16, where thermostat 16 is configured to control an operation of one or more of dry ice mill 24, pump 42, and/or air delivery system 14 to provide air within the aircraft at a desired temperature.

In one aspect of the present disclosure, thermostat 16 may be configured to control the operation of dry ice mill 24 so as to provide air within the aircraft at the desired temperature. In another aspect of the present disclosure, thermostat 16 may be configured to operate apparatus 12 so as to provide cooled air having a desired temperature of 40-50° F. within the aircraft.

Although dry ice hopper 22 may be sufficiently large to store adequate dry ice for anticipated cooling needs, in another aspect of the present disclosure system 10 may further include a dry ice generator 58 that is configured to convert liquid $CO_2$, typically stored in a pressurized cylinder, into solid dry ice which may then be added to dry ice hopper 22.

Figure 4:
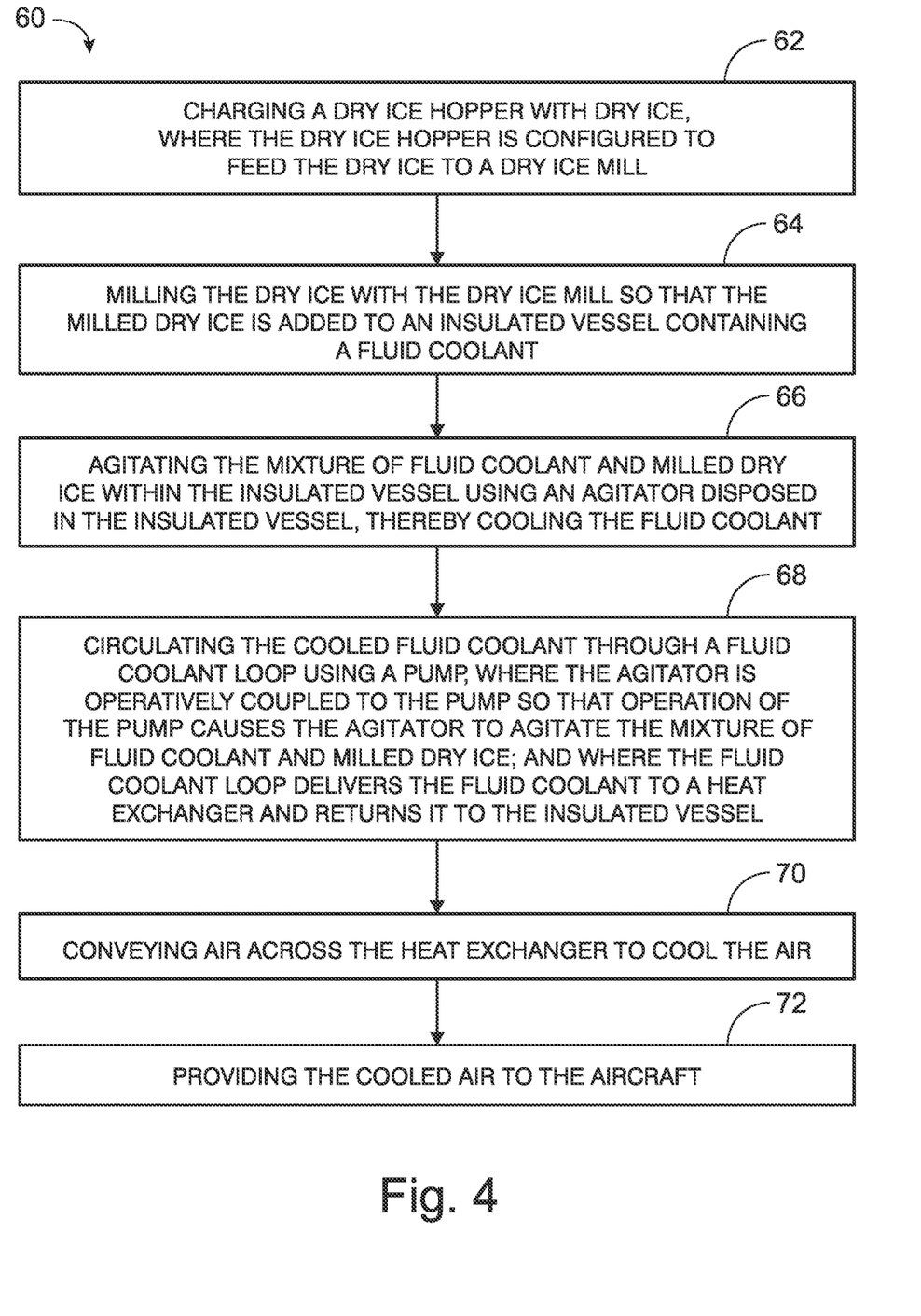
FIG. 4 is a flowchart describing a method of providing cooled air to an aircraft, according to the present disclosure.

The system and apparatus of the present disclosure lend themselves to a method of providing cooled air to an aircraft, as shown in flowchart 60 of FIG. 4. The method may include charging a dry ice hopper with dry ice, where the dry ice hopper is configured to feed the dry ice to a dry ice mill, as set out at step 62 of flowchart 60; milling the dry ice with the dry ice mill so that the milled dry ice is added to an insulated vessel containing a fluid coolant, at step 64 of flowchart 60; agitating the mixture of fluid coolant and milled dry ice within the insulated vessel using an agitator disposed in the insulated vessel, thereby cooling the fluid coolant, at step 66 of flowchart 60; circulating the cooled fluid coolant through a fluid coolant loop using a pump, where the agitator is operatively coupled to the pump so that operation of the pump causes the agitator to agitate the mixture of fluid coolant and milled dry ice; and where the fluid coolant loop delivers the fluid coolant to a heat exchanger and returns it to the insulated vessel, at step 68 of flowchart 60; conveying air across the heat exchanger to cool the air, at step 70 of flowchart 60; and providing the cooled air to the aircraft, at step 72 of flowchart 60.

In one aspect of the present disclosure, the step of providing the cooled air to the aircraft includes delivering the cooled air to a plurality of gaspers within the aircraft. In another aspect of the present disclosure, the step of milling the dry ice with the dry ice mill includes shredding or grating the dry ice. In another aspect of the present disclosure, the step of milling the dry ice with the dry ice mill includes grinding the dry ice to a dry ice powder. In yet another aspect of the present disclosure, the method further includes a step of venting $CO_2$ gas evolved from the fluid coolant to a fuel tank of the aircraft as an inerting agent.

EXAMPLES, COMPONENTS, AND ALTERNATIVES

The following numbered paragraphs describe selected aspects of the disclosed cooling systems and apparatus and methods of providing cooled air to aircraft. The examples in these sections are intended for illustration and should not be interpreted as limiting the entire scope of the present disclosure. Each section may include one or more distinct embodiments or examples, and/or contextual or related information, function, and/or structure.

A1. An apparatus for providing cooled air within an aircraft, comprising an insulated vessel containing a fluid coolant; a dry ice mill configured to mill dry ice into the fluid coolant within the insulated vessel; a dry ice hopper configured to store dry ice and feed the dry ice to the dry ice mill; a fluid coolant loop connecting the insulated vessel and a heat exchanger, where the fluid coolant loop is configured to deliver the fluid coolant to the heat exchanger and return it to the insulated vessel; a pump operatively coupled with the fluid coolant loop to transport the fluid coolant through the fluid coolant loop; an agitator disposed within the insulated vessel and coupled to the pump, configured so that operation of the pump will cause the agitator to agitate a mixture of the fluid coolant and milled dry ice within the insulated vessel; and an air delivery system that conveys air across the heat exchanger and provides the cooled air within the aircraft.

A2. The apparatus of paragraph A1, where the pump includes a drive shaft that extends through a wall of the insulated vessel, and the agitator is coupled to the drive shaft, such that operation of the pump causes rotation of the agitator and agitates the mixture of milled dry ice and fluid coolant.

A3. The apparatus of paragraph A1, wherein the dry ice mill is one of a grinder, a crusher, a shredder, or a pelletizer.

A4. The apparatus of paragraph A1, wherein the dry ice mill is configured to mill a dry ice powder into the fluid coolant.

A5. The apparatus of paragraph A1, wherein the dry ice mill is configured to operate intermittently to control the rate of dry ice addition to the fluid coolant, wherein an amount of dry ice that is between about $\frac{1}{10}$ and $\frac{1}{20}$ of the weight of the coolant in the insulated vessel is added to the fluid coolant per minute.

A6. The apparatus of paragraph A1, wherein the fluid coolant includes an organic glycol.

A7. The apparatus of paragraph A6, wherein the fluid coolant includes one or more of ethylene glycol, diethylene glycol, and propylene glycol.

A8. The apparatus of paragraph 6, wherein the fluid coolant is substantially free of water.

B1. A system for providing cooled air within an aircraft, comprising an apparatus including an insulated vessel containing a heat transfer fluid; a dry ice mill configured to mill dry ice into the heat transfer fluid within the insulated vessel; a dry ice hopper configured to store dry ice and feed the dry ice to the dry ice mill; a fluid coolant loop connecting the insulated vessel and a heat exchanger, where the fluid coolant loop is configured to deliver the heat transfer fluid to the heat exchanger and return it to the insulated vessel; a pump operatively coupled with the fluid coolant loop to transport the heat transfer fluid through the fluid coolant loop; and an agitator disposed within the insulated vessel and coupled to the pump, configured so that operation of the pump will cause the agitator to agitate a mixture of the heat transfer fluid and milled dry ice within the insulated vessel; an air delivery system that conveys air across the heat exchanger and provides the cooled air within the aircraft; and a thermostat configured to operate the apparatus so as to provide air within the aircraft at a desired temperature.

B2. The system of paragraph B1, wherein the air delivery system provide the cooled air within the aircraft via a plurality of gaspers.

B3. The system of paragraph B1, wherein the thermostat is configured to control an operation of one or more of the dry ice mill, the pump, and the air delivery system to provide air within the aircraft at the desired temperature.

B4. The system of paragraph B3, wherein the thermostat is configured to control the operation of the dry ice mill to provide air within the aircraft at the desired temperature.

B5. The system of paragraph B1, wherein the thermostat is configured to operate the apparatus so as to provide air having a desired temperature of 40-50° F. within the aircraft.

B6. The system of paragraph B1, further comprising a venting system for the apparatus that is configured to deliver evolved $CO_2$ gas from the apparatus to one or more fuel tanks, cargo areas, or galley areas for use as an inerting or fire suppressing agent.

B7. The system of paragraph B1, further comprising a dry ice generator configured to convert liquid $CO_2$ to solid dry ice for addition to the dry ice hopper.

C1. A method of providing cooled air to an aircraft, comprising charging a dry ice hopper with dry ice, where the dry ice hopper is configured to feed the dry ice to a dry ice mill; milling the dry ice with the dry ice mill so that the milled dry ice is added to an insulated vessel containing a fluid coolant; agitating the mixture of fluid coolant and milled dry ice within the insulated vessel using an agitator disposed in the insulated vessel, thereby cooling the fluid coolant; circulating the cooled fluid coolant through a fluid coolant loop using a pump, where the agitator is operatively coupled to the pump so that operation of the pump causes the agitator to agitate the mixture of fluid coolant and milled dry ice; and where the fluid coolant loop delivers the fluid coolant to a heat exchanger and returns it to the insulated vessel; conveying air across the heat exchanger to cool the air; and providing the cooled air to the aircraft.

C2. The method of paragraph C1, wherein providing the cooled air to the aircraft includes delivering the cooled air to a plurality of gaspers within the aircraft.

C3. The method of paragraph C1, wherein milling the dry ice with the dry ice mill includes shredding or grating the dry ice.

C4. The method of paragraph C1, wherein milling the dry ice with the dry ice mill includes grinding the dry ice to a dry ice powder.

C5. The method of paragraph C1, further comprising venting $CO_2$ gas evolved from the fluid coolant to a fuel tank of the aircraft as an inerting agent.

ADVANTAGES, FEATURES, BENEFITS

The different embodiments and examples of the systems and methods described herein for providing cooled air to an aircraft provide several advantages over previous strategies for cooling aircraft. Previous solutions have required air cycle packs, or vapor cycle packs, which require a large amount of energy to accomplish the same amount of cooling, and do so using much heavier equipment.

The use of solid carbon dioxide (dry ice) for cooling an aircraft provides a dramatic reduction in the power demands for cooling passengers, and therefore provides an advantageous alternative for aircraft having restricted power generating capabilities, such as smaller commuter aircraft and/ or battery-powered aircraft of all sizes.

Advantageously, the apparatus and systems of the present disclosure may be used to cool aircraft without the need for starting the engine, or auxiliary power unit (APUP). The low power requirements of the system mean it may operate on a relatively small battery. The disclosed apparatus eliminates the need for a heat sink, with its associated energy requirements and imposed drag.

Because the presently disclosed apparatus employs a consumable cooling material, the weight of the cooling apparatus is reduced during operation. When cooling is not required, no dry ice need be loaded onto the aircraft, thereby saving weight. In addition, the apparatus does not employ any refrigerants, such as CFCs, with their associated expense and hazards. The cooling byproduct of the operation of the apparatus, carbon dioxide gas, may be used to accomplish fuel tank or cargo compartment inerting, creating carbon dioxide for fire suppression, or cooling electronic systems.

The disclosed apparatus is mechanically simple, does not employ complex components, high tolerance machining, or sophisticated control systems, and does not require specifically-trained maintenance personnel or special equipment for repair or troubleshooting.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An apparatus for providing cooled air within an aircraft, comprising:
    an insulated vessel containing a fluid coolant;
    a dry ice mill configured to mill dry ice, having an impeller configured to rotate, where energizing the impeller causes the dry ice to be driven into the fluid coolant within the insulated vessel;
    a dry ice hopper configured to store dry ice and feed the dry ice to the dry ice mill, wherein the impeller drives the dry ice from the dry ice hopper against a screen, which converts the dry ice into a dry ice snow;
    a fluid coolant loop connecting the insulated vessel and a heat exchanger, where the fluid coolant loop is configured to deliver the fluid coolant to the heat exchanger and return the fluid coolant to the insulated vessel;
    a pump operatively coupled with the fluid coolant loop to transport the fluid coolant through the fluid coolant loop;
    an agitator disposed within the insulated vessel and coupled to the pump, configured so that operation of the pump will cause the agitator to agitate a mixture of the fluid coolant and milled dry ice within the insulated vessel; and
    an air delivery system that conveys air across the heat exchanger and provides the cooled air within the aircraft;
    wherein the pump includes a drive shaft that extends through a wall of the insulated vessel, and the agitator is coupled to the drive shaft, such that operation of the pump causes rotation of the agitator and agitates the mixture of the fluid coolant and milled dry ice.

2. The apparatus of claim 1, wherein the dry ice mill is one of a grinder, a crusher, a shredder, or a pelletizer.

3. The apparatus of claim 1, wherein the dry ice mill is configured to mill a dry ice powder into the fluid coolant.

4. The apparatus of claim 1, wherein the dry ice mill is configured to operate intermittently.

5. The apparatus of claim 1, wherein the fluid coolant includes an organic glycol.

6. The apparatus of claim 5, wherein the fluid coolant includes one or more of ethylene glycol, diethylene glycol, and propylene glycol.

7. The apparatus of claim 5, wherein the fluid coolant is substantially free of water.

8. A system for providing cooled air within an aircraft, comprising:
    an apparatus including
        an insulated vessel containing a heat transfer fluid;
        a dry ice mill configured to mill dry ice, having an impeller configured to rotate, where energizing the impeller causes dry ice to be driven into the heat transfer fluid within the insulated vessel;
        a dry ice hopper configured to store dry ice and feed the dry ice to the dry ice mill, wherein the impeller drives the dry ice from the dry ice hopper against a screen, which converts the dry ice into a dry ice snow;
        a fluid coolant loop connecting the insulated vessel and a heat exchanger, where the fluid coolant loop is configured to deliver the heat transfer fluid to the heat exchanger and return the heat transfer fluid to the insulated vessel;
        a pump operatively coupled with the fluid coolant loop to transport the heat transfer fluid through the fluid coolant loop; and
        an agitator disposed within the insulated vessel and coupled to the pump, configured so that operation of the pump will cause the agitator to agitate a mixture of the heat transfer fluid and milled dry ice within the insulated vessel;
    an air delivery system that conveys air across the heat exchanger and provides the cooled air within the aircraft; and
    a thermostat configured to operate the apparatus so as to provide air within the aircraft at a desired temperature;
    wherein the pump includes a drive shaft that extends through a wall of the insulated vessel, and the agitator is coupled to the drive shaft, such that operation of the pump causes rotation of the agitator and agitates the mixture of the heat transfer fluid and milled dry ice.

9. The system of claim 8, wherein the air delivery system provides the cooled air within the aircraft via a plurality of gaspers.

10. The system of claim 8, wherein the thermostat is configured to control an operation of one or more of the dry ice mill, the pump, and the air delivery system to provide air within the aircraft at the desired temperature.

11. The system of claim 10, wherein the thermostat is configured to control the operation of the dry ice mill to provide air within the aircraft at the desired temperature.

12. The system of claim 8, wherein the thermostat is configured to operate the apparatus so as to provide air having a desired temperature of 40-50° F. within the aircraft.

13. The system of claim 8, further comprising a venting system for the apparatus that is configured to deliver evolved $CO_2$ gas from the apparatus to one or more fuel tanks, cargo areas, or galley areas for use as an inerting or fire suppressing agent.

14. The system of claim 8, further comprising a dry ice generator configured to convert liquid $CO_2$ to solid dry ice for addition to the dry ice hopper.

15. A method of providing cooled air to an aircraft, comprising:
    charging a dry ice hopper with dry ice, where the dry ice hopper is configured to feed the dry ice to a dry ice mill;

milling the dry ice with the dry ice mill so that the milled dry ice is added to an insulated vessel containing a fluid coolant to form a mixture, including driving the dry ice into the fluid coolant by rotating an impeller, wherein the impeller drives the dry ice from the dry ice hopper against a screen, which converts the dry ice into a dry ice snow;

agitating the mixture of fluid coolant and milled dry ice within the insulated vessel using an agitator disposed in the insulated vessel, thereby cooling the fluid coolant;

circulating the cooled fluid coolant through a fluid coolant loop using a pump, where the agitator is operatively coupled to the pump so that operation of the pump causes the agitator to agitate the mixture of fluid coolant and milled dry ice; and where the fluid coolant loop delivers the fluid coolant to a heat exchanger and returns it to the insulated vessel;

conveying air across the heat exchanger to cool the air; and providing the cooled air to the aircraft;

wherein the pump includes a drive shaft that extends through a wall of the insulated vessel, and the agitator is coupled to the drive shaft, such that operation of the pump causes rotation of the agitator and agitates the mixture of the fluid coolant and milled dry ice.

16. The method of claim 15, wherein providing the cooled air to the aircraft includes delivering the cooled air to a plurality of gaspers within the aircraft.

17. The method of claim 15, wherein milling the dry ice with the dry ice mill includes shredding or grating the dry ice.

18. The method of claim 15, wherein milling the dry ice with the dry ice mill includes grinding the dry ice to a dry ice powder.

19. The method of claim 15, further comprising venting $CO_2$ gas evolved from the fluid coolant to a fuel tank of the aircraft as an inerting agent.

20. The apparatus of claim 1, wherein operation of the dry ice mill and the impeller is controlled to regulate an amount of dry ice delivered into the fluid coolant within the insulated vessel.

21. The apparatus of claim 1, wherein the fluid coolant comprises ethylene glycol, and a rate of addition of dry ice is at least an addition of 0.5 lbs. of dry ice per minute relative to 9.5 lbs. of the fluid coolant, such that an amount of dry ice by weight that is added per minute is at a ratio of at least $\frac{1}{20}$ to an amount of coolant by weight that is within the insulated vessel.

22. The apparatus of claim 1, wherein the fluid coolant comprises ethylene glycol, and an addition of dry ice is controlled by the dry ice mill to control a ratio of a dry ice content relative to a fluid coolant content.

23. The apparatus of claim 22, wherein a rate of addition of dry ice includes an addition of at least 34.5 lbs. of dry ice over a 30-minute period to a quantity of 9.5 lbs. of the fluid coolant, such that the dry ice reduces a temperature of the fluid coolant near to a point of freezing of the fluid coolant without freezing the fluid coolant.

24. The apparatus of claim 1, wherein the insulated vessel is connected to the fluid coolant loop installed within a cabin of the aircraft.

25. The apparatus of claim 24, wherein operation of the agitator is synchronized with circulation of the fluid coolant in the fluid coolant loop driven by the pump.

26. The apparatus of claim 1, further comprising:
a thermostat configured to control operation of the dry ice mill based on a temperature measurement inside an aircraft cabin.

27. The apparatus of claim 1, wherein the dry ice within the dry ice hopper is fed by gravity into the dry ice mill via a sloping surface incorporated in the dry ice hopper.

* * * * *